United States Patent [19]

Rosen

[11] 4,076,648
[45] Feb. 28, 1978

[54] SELF-DISPERSIBLE ANTIFOAM COMPOSITIONS

[75] Inventor: Meyer Robert Rosen, Spring Valley, N.Y.

[73] Assignee: Union Carbide Corporation, New York, N.Y.

[21] Appl. No.: 691,395

[22] Filed: Jun. 1, 1976

[51] Int. Cl.² .............................................. B01D 19/04
[52] U.S. Cl. ..................................... 252/358; 252/321
[58] Field of Search .................. 252/358, 321, DIG. 1

[56] References Cited

U.S. PATENT DOCUMENTS

| | | | |
|---|---|---|---|
| 2,829,112 | 4/1958 | Solomon | 252/358 |
| 3,235,509 | 2/1966 | Nitzsche et al. | 252/358 |
| 3,250,727 | 5/1966 | Noll et al. | 252/358 |
| 3,408,306 | 10/1968 | Boylan | 252/321 |
| 3,560,401 | 2/1971 | O'Hara et al. | 252/321 X |
| 3,560,403 | 2/1971 | O'Hara et al. | 252/358 |
| 3,650,979 | 3/1972 | Steinbach et al. | 252/358 |
| 3,962,119 | 6/1976 | Cosentino et al. | 252/358 X |

FOREIGN PATENT DOCUMENTS

| | | |
|---|---|---|
| 698,179 | 11/1964 | Canada. |
| 1,079,832 | 8/1967 | United Kingdom. |

Primary Examiner—Brooks H. Hunt
Assistant Examiner—E. Suzanne Parr
Attorney, Agent, or Firm—Reynold J. Finnegan

[57] ABSTRACT

Self-dispersible, non-aqueous antifoam compositions comprising a lipophilic nonionic surface active agent homogeneously dispersed in a non-emulsified diorganosiloxane antifoam agent.

12 Claims, No Drawings

SELF-DISPERSIBLE ANTIFOAM COMPOSITIONS

BACKGROUND OF THE INVENTION

This invention relates to novel non-aqueous silicone antifoam compositions.

Silicone antifoams prepared from an inorganic filler, e.g. fumed silica, and a variety of organo-siloxane polymers are well known in the art. However, heretofore such antifoam compositions have not been found to be readily dispersible in water and generally must first be emulsified in water if they are to be used effectively in aqueous foam systems. In addition such antifoam emulsions are subject to creaming of the dispersed antifoam and thus normally must be thickened with a water soluble polymer in order to be stabilized. Moreover, such emulsified antifoams also generally require biocides to control the bacteria that can grow in the water in the emulsion upon storage.

SUMMARY OF THE INVENTION

It has now been discovered that non-emulsified antifoam agents can be made more readily dispersible in water and thus more effective without the need for emulsification as witnessed by the novel silicone antifoam compositions of this invention.

The silicone antifoam compositions of this invention are self-dispersible, i.e. they do not have to be emulsified to be effective, but can be added directly to the aqueous foaming media. Moreover, since the silicone antifoam compositions of this invention are superior in performance to corresponding non-emulsified antifoams, a variety of benefits are obtained, not the least of which is the significant time and economical savings that is realized by eliminating the prior need for said emulsification procedure as well as the elimination of "non-dispersibles" resulting from poor emulsification. In addition, the need for a biocide to control potential bacterial problems can be eliminated by the instant invention due to the non-aqueous nature of the antifoams of the instant invention. Further, because the silicones antifoams of this invention are highly concentrated, extensive savings can obviously be achieved by the instant invention in reduced shipping, storage and container costs over emulsified antifoams.

Therefore, it is an object of this invention to provide novel non-aqueous antifoam compositions that are self-dispersible in aqueous foam systems. Other objects and advantages of this invention will become readily apparent from the following description and appended claims.

More particularly this invention is directed to a non-aqueous silicone antifoam composition consisting essentially of a lipophilic nonionic surface active agent homogeneously dispersed in a non-emulsified hydrophobic diorganosiloxane antifoam agent, wherein the amount ratio of said surface active agent to said antifoam agent ranges from about 0.2 to about 25 parts by weight of the surface active agent per 100 parts by weight of the antifoam agent.

It is of course to be understood that the antifoam compositions of this invention read on employing a single component of the type specified or any of the various combinations of component mixtures possible. For instance, in addition to compositions of a single type of diorganosiloxane antifoam agent, the compositions of this invention include mixtures of nonionic surface active agents dispersed in a single diorganosiloxane antifoam agent, a single nonionic surface active agent dispersed in mixtures of diorganosiloxane antifoam agents as well as mixtures of nonionic surface active agents dispersed in mixtures of diorganosiloxane antifoam agents.

DESCRIPTION OF THE PREFERRED EMBODIMENTS

The present invention is based on the discovery that non-aqueous compositions consisting essentially of a lipophilic nonionic surface active agent homogeneously dispersed in a non-emulsified diorganosiloxane antifoam agent are readily self-dispersible in aqueous foam systems. The term non-aqueous as employed herein means that the antifoam compositions of this invention contain less than 1 percent by weight of water. Preferably said antifoam compositions are free from any deliberately added water.

Any non-emulsified hydrophobic diorganosiloxane antifoam agent heretofore employed in the preparation of antifoam emulsions for aqueous foam systems can be employed in this invention. Such non-emulsified diorganosiloxane antifoam agents and/or methods for their preparation are well known in the art as witnessed for example by U.S. Pat. Nos. 3,235,509; 3,560,401 and "Antifoaming and Defoaming Agents" by T. G. Rubel (1972) published by Noyes Data Corporation, Park Ridge, New Jersey. Thus, the manner in which the non-emulsified agent is prepared is not critical to the instant invention.

The preferred non-emulsified hydrophobic diorganosiloxane antifoam agents employable herein consist essentially of the product resulting from heating in the presence of a catalyst if desired, a mixture consisting essentially of a diorganosiloxane polymer and a finely divided inorganic filler.

The diorganosiloxane polymers employed in forming the preferred non-emulsified hydrophobic silicone antifoam agents used in this invention can be any of the well known types heretofore employed in the preparation of antifoam compositions. The polymers generally have hydrocarbon groups having from 1 to 18 carbon atoms, e.g. alkyl, aryl, alkaryl, aralkyl and the like, bonded to silicon in the ratio of about 1.8 to about 2.2 hydrocarbon groups per silicon atom. Most preferably, the hydrocarbon group is methyl and the basic unit of the polymer is the dimethylsiloxane unit which constitutes at least 65 mol percent and preferably at least 97.0 mol percent or more of the siloxane polymer. Other units can be present, such as trimethylsiloxane units which can be present in amounts up to 25 mol percent of the polymer, more preferably, about 0.5 to 3 mol percent of the polymer. In addition, the polymer can contain still other units, such as, monomethylsiloxane units and unsubstituted siloxane units, i.e., $SiO_{4/2}$, in minimum amounts of less than 10 mol percent and preferably below 0.2 mol percent of the siloxane polymer. Preferred diorganosiloxane polymers are the trimethylsiloxy endblocked dimethylsiloxane polymers having the formula

wherein Me designates the methyl group and $n$ is an integer. The diorganosiloxane polymers can have a viscosity in the range of about 5 to about 100,000 centistokes measured at 25° C and preferably have a viscosity in the range of about 5 to 3000 centistokes at 25° C.

Thus, the value of the integer $n$ is such that the siloxane polymer possesses a viscosity within the above mentioned broad or preferred range.

The finely divided inorganic filler employed in forming the preferred non-emulsified hydrophobic silicone antifoam agents used in this invention can be any of the well known types heretofore employed in the preparation of antifoam compositions. The finely divided inorganic fillers employed in this invention are finely powdered materials, such as, aluminum oxide, titanium dioxide, and, preferably, finely divided silicas, such as, precipitated, arc or fumed silica. The filler, preferably, is the range of about 7 to about 14 millimicrons, as calculated from the surface area (BET Method) assuming sphericity of particles, J. Am. Chem. Soc., Vol. 60, p. 309 (1938).

While the preferred non-emulsified hydrophobic silicone antifoam agents used in this invention can be produced without the use of a catalyst, a catalyst can be employed if desired. When employed the catalysts can be any of the well known types heretofore employed in the preparation of antifoam compositions such as the acid catalysts disclosed in U.S. Pat. No. 3,235,509 and the basic catalysts disclosed in U.S. Pat. No. 3,560,401. Illustrative examples of such acid catalysts include those acid condensation catalysts commonly employed in organopolysiloxane chemistry such as protonic acids and Lewis acids (see "Chemie und Technologie der Silicone" by W. Noll, pages 138 - 144) as well as compounds splitting off protonic acids in the presence of water. The dissociation constant of the protonic acids in dilute water solution at 25° C. is preferably not under 1 $\times$ 10$^{-5}$. Preferred acid catalysts include AlCl$_3$, FeCl$_3$, SnCl$_4$, TiCl$_4$, BF$_3$, ZnCl$_2$ as well as phosphorous nitrile halides and organo nitrogen derivatives of phosphorous acid or phosphoric acid in which the nitrogen is substituted by organic radicals as described in U.S. Pat. No. 2,830,967.

Illustrative examples of such basic catalysts include alkali metal and alkaline earth metal oxides, hydroxides, alkoxides, aryloxides and silanolates, tetraalkylammonium hydroxides, alkoxides and silanolates, tetraalkylphosphonium hydroxides, alkoxides and silanolates, trialkylhydrazinium hydroxides, alkoxides and silanolates, trialkylguanidinium hydroxides, alkoxides and silanolates and monoalkyl, dialkyl and trialkyl amines. Typical examples of basic materials of this type include sodium, potassium, magnesium, calcium strontium and cesium hydroxides; sodium, potassium, magnesium calcium and cesium oxides, sodium, potassium, magnesium, calcium and cesium methoxides, ethoxides, phenoxides and butoxides; sodium, potassium, magnesium, calcium and cesium salts of methylsilanetriol, dimethylsilanediol, and phenylsilanetriol; tetramethylammonium hydroxides, tetraethylammonium hydroxides; phenyltrimethylammonium hydroxides, triethyloctadecylammonium hydroxides, benzyltrimethylammonium hydroxides, cyclohexyltributylammonium hydroxides, vinyltrimethylammonium hydroxides, benzyl betahydroxyethyldimethylammonium hydroxides, tolyltriethylammonium hydroxides, tris-(beta-hydroxyethyl)-methylammonium hydroxide, 12-hydroxyoctadecyltrimethylammonium hydroxides, hydroxyphenyltriethylammonium hydroxide, hydroxcyclohexyltributylammonium hydroxides, hydroxyphenylhydroxyethyldimethylammonium hydroxide, hydroxyphenylbenzyldibutylammonium hydroxide, tetramethyl phosphonium hydroxide, tetraethyl phosphonium hydroxide, tetra-n-butyl phosphonium hydroxide, dimethyldiethyl phosphonium hydroxide, phenyltrimethyl phosphonium hydroxide, butyltricyclohexyl phosphonium hydroxide, tetramethyl phosphonium methoxide, tetrabutyl phosphonium butoxide, etc. many examples of such quaternary phosphonium compounds being more particularly disclosed in U.S. Pat. No. 2,883,366, trimethylhydrazinium hydroxide, methoxide, n-butoxide and dimethylsilanolate, tri-n-butylhydrazinium hydroxide, ethoxide and phenylsilanolate, triethylguanidinum hydroxide, propoxide and methylsilanolate di-n-butylamine, di-n-hexylamine and ethylenediamine and the like. Preferably the alkaline catalysts, which contain carbon, contain no more than 18 carbon atoms. Preferred basic materials are potassium silanolate and potassium hydroxide.

As pointed out above non-emulsified hydrophobic silicone antifoam agents used in this invention can be prepared in any conventional manner such as by heating, in the presence of a catalyst if desired, a mixture consisting essentially of a diorganosiloxane polymer and a finely divided inorganic filler. The amounts of diorganosiloxane polymer, inorganic filler and catalyst mixed and heated together are not narrowly critical. Typical ranges of amounts of these respective materials include from about 0.5 to about 43 (preferably about 1 to about 10) parts by weight of the inorganic filler per 100 parts by weight of the diorganopolysiloxane polymer employed and from about 0 to about 7 (preferably about 0.01 to about 1.5) parts by weight of the catalyst per 100 parts by weight of the diorganopolysiloxane polymer employed.

The non-emulsified hydrophobic silicone antifoam agents used in this invention can be prepared by blending the above-mentioned materials together and heating them at an elevated temperature which is not narrowly critical. Typically the elevated temperature can range from about 60° C. to about 250° C. with the preferred temperature being from about 100° C. to about 200° C. The period of heating likewise is not narrowly critical and for example can range from at least ¼ hour to 5 hours or higher if desired, and preferably ranges from at least about ½ hour to 2 hours. If desired, the mixture can be mildly agitated during the heating operation. After the heating operation the mixture need not be further processed in any way. However, if desired, the resulting heated mixture may be subjected to any heretofore conventional processing operation such as to remove, neutralize or otherwise destroy the activity of the catalysts or any by-products resulting from the heating step.

Any lipophilic nonionic surface active agent can be employed in this invention. The nonionic surface active agent can be a nonionic organic surface active agent or a nonionic siloxane surface active agent. The term lipophilic as used herein means that the nonionic surface active agent has a hydrophilic-lipophilic balance (HLB) of up to about 10 and is preferably less than about 9. Said hydrophilic-lipophilic balance, hereinafter referred to as HLB, is a measure of the balance of the size and strength of the hydrophilic (water-loving or polar) and the lipophilic (oil-loving or non-polar) groups of a surface active agent. The HLB of a surface active agent is related to its solubility and a surface active agent having a low HLB will tend to be oil-soluble, while one having a high HLB will tend to be water-soluble. As employed herein surface active agents having an HLB number of up to about 10 are considered to be lipophilic in character (i.e. tend to be oil-soluble) while surface active agents having a higher HLB number are considered to be hydrophilic in character (i.e. tend to be water-soluble). The HLB methods of determining the characteristics of a surface active agent are well known in the art and can be found more fully explained e.g. in "The Atlas HLB System a time-saving guide to emulsifier selection," 4th Printing May, 1971, published by the Atlas Chemical Industries, Inc., Wilmington, Delaware, (now known as ICI United States Inc.), the disclosure of which is encompassed herein by reference thereto. For example HLB values of most polyol fatty acid esters can be calculated with the formula $$HLB = 20[(1 - (S/A)]$$

where S = saponification number of the ester (AOCS Cd 3-25) and A = acid number of the recovered acid (AOCS Cd 6-38 and AOCS L3a-57). Where the hydrophilic portion of organic surface active agents consist of ethylene oxide only the formula is simply $$HLB = E/5$$

wherein E = weight percent oxyethylene content (Morgan, P. W., "Determination of Ethers and Esters of Ethylene Glycol," Ind. and Eng. Chem., Anal. Ed., Vol. 18, page 500, 1946). While the above formulas given above are satisfactory for many non-ionic surface active agents certain other nonionic types exhibit behavior which is apparently unrelated to their composition, e.g. those containing propylene oxide, butylene oxide, nitrogen and sulfur. The HLB values of these nonionics can be experimentally estimated so that their HLB values are aligned with those of common nonionic surface active agents. While the experimentally determined HLB value will not necessarily indicate the percentage weight of its hydrophilic portion, it does indicate its apparent HLB when used in combination with other surface active agents. This experimental method of HLB determination, while not precise, briefly consists of blending the unknown surface active agent in varying ratios with a surface active agent of known HLB and using the blend to emulsify an oil of known required HLB. The blend which performs the best is assumed to have an HLB value approximately equal to the required HLB of the oil, so that the HLB value of the unknown can be calculated. A simpler and easier method for obtaining a rough estimate of HLB can be made from the water-solubility of the surface active agent. This method is especially suitable for screening nonionic siloxane surface active agents and merely involves approximating their HLB values according to their solubility or dispersibility in water as shown in the following Table:

| HLB by Dispersibility | HLB Range |
|---|---|
| No dispersibility in water | 1–4 |
| Poor dispersion | 3–6 |
| Milky dispersion after vigorous agitation | 6–8 |
| Stable milky dispersion | 8–10 |
| Translucent to clear dispersion | 10–13 |
| Clear solution | 13+ |

The determination of a HLB value for a given nonionic surface active agent generally has precision factor of about +1. l Thus, the preferred nonionic surface active agents useful in this invention are those having an HLB value of less than about 9.

Of course, as pointed out above, it is to be understood that if desired mixtures of two or more nonionic surface active agents can be employed herein and that the mixtures can consist of different nonionic organic surface active agents, different nonionic siloxane surface active agents, or mixtures of nonionic organic and nonionic siloxane surface active agents. It is to be further understood that the term lipophilic nonionic surface active agent as employed herein includes not only the above types of liophilic nonionic surface active agents and mixtures thereof, but mixtures of lipophilic nonionic surface active agents and hydrophilic nonionic surface active agents as well, so long as such mixtures are lipophilic, i.e. have a HLB value of only up to about 10 and preferably less than about 9. For example, a blend, consisting of about 67 percent by weight of a nonionic surface active agent having a HLB value of about 4.7 and about 33 percent by weight of a nonionic surface active agent having a HLB value of about 16.9, has a blended HLB value of about 8.9 and such types of mixtures are included within the scope of this invention.

Nonionic surface active agents and/or methods for their preparation which are useful in this invention are well known in the art as witnessed for example by "McCutcheon's Detergents and Emulsifiers," North American Ed. 1975 Annual, McCutcheon Division, M. C. Publishing Co., Ridgewood, New Jersey, the disclosure of which is incorporated herein by reference thereto. Any lipophilic nonionic organic or siloxane surface active agent, or mixtures thereof can be employed in this invention. Illustrative lipophilic nonionic organic surface active agents include polyoxyalkylene alcohols, such as nonylphenol + 4 moles of ethylene oxide, $C_{11}$ to $C_{15}$ alcohols + 3 moles of ethylene oxide, polyoxyethylene (4) lauryl ether, polyoxyethylene (2) cetyl ether, polyoxyethylene (2) stearyl ether, polyoxyethylene (2) oleyl ether, and the like; mono and diglycerides, such as mono and diglycerides from the glycerolysis of edible fats, mono and diglycerides of fat forming fatty acids, mono and diglycerides from the glycerolysis of edible fats or oils and the like; sorbitan fatty acid esters, such as sorbitan monooleate, sorbitan partial fatty esters, sorbitan monolaurate, sorbitan monopalmitate, sorbitan monostearate, sorbitan sesquioleate, sorbitan trioleate, sorbitan tristearate, and the like; polyoxyalkylene sorbitan fatty acid esters, such as polyoxyethylene (4) sorbitan monostearate, and the like; and polyoxyalkylene sorbitol esters, such as polyoxyethylene sorbitol oleate, polyoxyethylene sorbitol beeswax derivative and the like, as well as any of the other known types of nonionic surface active agents that are lipophilic. The precise structural and formula configurations of such nonionic organic surface active agents is considered to be immaterial so long as the nonionic organic surface active agent is lipophilic in character as defined herein above. Illustrative commercial lipophilic nonionic organic surfactants include, e.g. certain Tergitol surfactants of Union Carbide Corporation and certain Atmos, Atmul, Aracel, Atpet, Span, Tween, Atlox and Brij surfactants of ICI United States Inc.

Illustrative lipophilic siloxane surface active agents include siloxane-oxyalkylene block copolymers. Such copolymers are composed essentially of siloxy units having the formula

wherein R is a monovalent hydrocarbon radical, especially methyl; R' is a divalent organic group linked directly to the silicon atom; R" is an oxyalkylene group; R''' is a monovalent organic terminating group; $n$ is an integer; $a$ has a value of from 1 to 3 inclusive; $b$ has a value of from 1 to 3 inclusive, and siloxy units having the formula

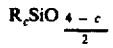

wherein R is the same as defined in formula (A) above and $c$ has a value of from 0 to 3 inclusive. Such types of siloxane-oxyalkylene block copolymers and/or methods for their preparation are well known in the art as witnessed for example, by U.S. Pat. Nos. 2,834,748; 2,917,480; 3,398,104; 3,402,192; 3,507,815; 3,741,917; and the like. The precise structural and formula configurations of such siloxane-oxyalkylene block copolymers is considered immaterial so long as the nonionic siloxane surface active agent is lipophilic in character as defined herein above. Illustrative of some of the more preferred groups represented by formula (A) and (B) above are those wherein R is a lower alkyl radical, especially methyl; wherein R' is a —$C_dH_{2d}O$— group where $d$ is an integer and the oxygen atom is linked directly to the silicon atom, or more preferably a divalent hydrocarbon group linked directly to the silicon atom through a carbon to silicon bond, e.g. propylene; wherein R" is the oxyalkylene portion or block of the siloxane-oxyalkylene block copolymer said oxyalkylene block being composed of an oxyalkylene group of the formula [—$C_dH_{2d}O$—] where $d$ is an integer, e.g. oxyethylene, oxypropylene, as well as mixtures of oxyethylene and oxypropylene, and the like. Preferably the oxyalkylene group is composed of oxyethylene or a mixture of oxyethylene and oxypropylene radicals; and wherein R''' represents an organic terminal groups such as hydroxy, alkoxy, aryloxy, arylalkyloxy, alkenyloxy, acyloxy, carbamyloxy and carbonate groups the preferred terminal group being an alkoxy group of 1 to 4 carbon atoms. Illustrative of the more preferred siloxane-oxyalkylene block copolymers are those composed essentially of siloxy units of the formula $R_3SiO_{0.5}$, $R_2SiO$, and [R'''(R")$_n$R']Si(R)O wherein R, R', R", R''' and $n$ are the same as defined above.

As pointed out above mixtures of the various lipophilic nonionic surface active agents can be employed as well as mixtures of such lipophilic agents and hydrophilic nonionic surface active agents so long as the mixture is lipophilic in character as herein defined above. Such hydrophilic nonionic surface active agents that may be employed are well known in the art. Illustrative hydrophilic surface active agents include those of the same surface active agent classes as defined above having an HLB of about 10, as well as the conventional polyoxyalkylene acids, e.g. the Myrj surfactants of ICI United States Inc., and the like.

The non-aqueous silicone antifoam compositions of this invention are prepared by homogeneously dispersing a lipophilic nonionic surface active agent in a non-emulsified hydrophobic diorganosiloxane antifoam agent. The term homogeneously dispersed as employed herein means that the non-aqueous silicone antifoam compositions of this invention are either homogeneous solutions as in the case where the lipophilic nonionic surface active agent is soluble in the non-emulsified hydrophobic diorganosiloxane antifoam agent or homogeneous dispersions wherein the lipophilic nonionic surface active agent is completely distributed throughout the composition as in the case where the lipophilic nonionic surface active agent is not soluble in the non-emulsified hydrophobic diorganosilxoane antifoam agent. Thus, the two components need only be throughly blended or mixed in any conventional known manner for obtaining homogeneous dispersions. In the case where lipophilic nonionic surface active agent is not soluble in the non-emulsified hydrophobic diorganosiloxane antifoam agent the surface active agent is preferably thoroughly mixed with the antifoam agent at a temperature sufficient to liquify the nonionic surface active agent if it is a solid until a homogeneous dispersion is obtained. Alternatively, if its a non-soluble solid, the lipophilic nonionic surface active agent can be preheated to its melting point and then throughly mixed with the non-emulsified hydrophobic diorganosiloxane antifoam agent, at a temperature sufficient to maintain the nonionic surface active agent as a liquid, until a homogeneous dispersion is obtained. It should be noted that particular attention should be applied to the amount of work (shear-time) expended to optimize the homogeneous dispersions of this invention. If too little work is put in surface active agent separation will occur with time, while if too much work is put in the performance of the base antifoam will degrade. The preferred intermediate work range in obtaining the optimized, most stable antifoam compositions of this invention will vary depending upon the particular surface active agent and antifoam components employed, however, the preferred limits can be easily determined by routine experimentation.

As pointed out above the amount ratio of lipophilic nonionic surface active agent to non-emulsified hydrophobic diorganosiloxane antifoam agent can range from about 0.2 to about 25 parts by weight of the surface active agent per 100 parts by weight of the antifoam agent. More preferably said amount ratio ranges from about 1 to about 12 parts by weight (most preferably about 5 to about 10 parts by weight) of the surface active agent per 100 parts by weight of the antifoam agent. In general the preferred surface active agents employed herein are the lipophilic nonionic organic surface active agents, especially mixtures of such lipophilic nonionic organic surface active agents.

Of course, it is to be understood that not every possible lipophilic nonionic surface active agent will be optimally suited for every possible non-emulsified hydrophobic diorgansiloxane antifoam agent and that the antifoam activity of the self-dispersible non-aqueous antifoam compositions will vary depending upon the ingredients employed. For example the compatibility of the surface active agent/antifoam mixture as evidenced by resistance to gross phase separation on standing or poor homogenity resulting in a lumpy appearance as well as the nature of the aqueous foaming media to which the antifoam is to be applied will play a role in the proper choice of surface active agent and concentration in terms of gaining suitable antifoam performance. However, the determination of optimum desired results is well within the knowledge of one skilled in the art and can be met by routine experimentation involving the proper selection of surface active agent, concentration and well known process techniques for preparing stable dispersions.

The non-aqueous silicone antifoam compositions of this invention can be employed as antifoamers in any of the same aqueous media systems that heretofore have employed conventional emulsified diorganosiloxane antifoam agents with the obvious advantage of course that the antifoams of this invention are self-dispersible in said aqueous media systems. Thus, the antifoam compositions of this invention are useful in many applications e.g. in the preparation and use of aqueous media systems such as shampoos, waste-water treatment, fermentation processing, paper making, paints, latex systems, cleaning compounds, laundry and detergent products, and the like, wherein foaming is not desired. It is apparent that the utility in a specific area will depend upon the aqueous media system to which the antifoam is to be applied and the resultant antifoam activity desired for said system.

The following examples are illustrative of the present invention and are not to be regarded as limiting. It is to be understood that all parts percentages and proportions referred to herein and in the claims are by weight unless otherwise indicated and that Me represents a methyl radical (—CH$_3$).

As set forth herein below and in the Examples, the following abbreviations are used.

| | Nonionic Surface Active Agents | |
|---|---|---|
| Surfactant | Composition | HLB+ Number |
| A | *Brij 52 (polyoxyethylene (2) cetylether) | 5.3 |
| B | *Brij 72 (Polyoxyethylene (2) stearylether) | 4.9 |
| C | *Brij 93 (Polyoxyethylene (2) oleylether) | 4.9 |
| D | *Arlacel 20 (Sorbitan monolaurate) | 8.6 |
| E | *Span 40 (Sorbitan monopalmite) | 6.7 |
| F | *Span 60 (Sorbitan monostearate) | 4.7 |
| G | *Arlacel 60 (Sorbitan monostearate) | 4.7 |
| H | *Span 65 (Sorbitan tristearate) | 2.1 |
| I | *Arlacel 83 (Sorbitan sesquioleate) | 3.7 |
| J | *Atmul 124 (Mono and diglycerides from the glycerolysis of edible fats) | 3.5 |
| K | *Atmos 300 (Mono and diglycerides of fat forming fatty acids) | 2.8 |
| L | *Myrj 52 (polyoxyethylene (40 stearate) | 16.9 |
| M | **Tergitol 15S3 (ethoxylated $C_{11}$-$C_{15}$ alcohols —3moles ethylene oxide) | 9.0 |
| N | **TergitOl 15S7 (ethoxylated $C_{11}$-$C_{15}$ alcohols —7 moles ethylene oxide) | 12.8 |
| O | About a 50:50% by wt. mixture of Span 60 and Brij 72 | 4.8 |
| P | About a 50:50% by wt. mixture of Arlacel 20 and Brij 72 | 6.8 |
| Q | About a 67:33% by wt. mixture of Arlacel 20 and Brij 72 | 7.4 |
| R | About a 50:50% by wt. mixture of Arlacel 20 and Brij 52 | 7.0 |
| S | About a 67:33% by wt. mixture of Arlacel 20 and Brij 52 | 7.5 |
| T | About a 67:33% by wt. mixture of Brij 52 and Brij 93 | 5.2 |
| U | About a 50:50% by wt. mixture of Brij 52 and Brij 93 | 5.1 |
| V | About a 67:33% by wt. mixture of Span 60 and Myrj 52 | 8.9 |
| W | Me$_3$SiO(Me$_2$SiO)$_{20}$(MeSiO)$_{3.2}$SiMe$_3$<br>                                                                                       |<br>C$_3$H$_6$(OC$_2$H$_4$)$_{19}$(OC$_3$H$_6$)$_{14}$OC$_4$H$_9$ | 10–13*** |
| X | Me$_3$SiO(Me$_2$SiO)$_{37}$(MeSiO)$_3$SiMe$_3$<br>                  |<br>C$_3$H$_6$(OC$_2$H$_4$)$_7$OCH$_3$ | 6–8*** |
| Y | Me$_3$SiO(Me$_2$SiO)$_{188}$(MeSiO)$_{12}$SiMe$_3$<br>                  |<br>C$_3$H$_6$(OC$_2$H$_4$)$_7$OCH$_3$ | 6–8*** |
| Z | Me$_3$SiO(Me$_2$SiO)$_{20}$(MeSiO)$_{3.2}$SiMe$_3$<br>                  |<br>C$_3$H$_6$(OC$_2$H$_4$)$_7$OCH$_3$ | 6–8*** |
| AA | About a 67:33% by wt. mixture of Tergitol 15S7 and Me$_3$SiO(Me$_2$SiO)$_{20}$(MeSiO)$_{3.2}$SiMe$_3$<br>                  |<br>C$_3$H$_6$(OC$_2$H$_4$)$_{19}$(OC$_3$H$_6$)$_{14}$OC$_4$H$_9$ | 10–13*** |

+Hydrophilic-lipophilic balance number
*Product of ICI United States Inc.
**Product of Union Carbide Corporation
***HLB determined by the surfactant's dispersibility in water.

TEST PROCEDURE

In the Examples appearing below, the following test procedure was used to determine the effectiveness of the antifoams.

About 0.1 gram of the antifoam tested was added to about 250 grams of a freshly prepared homogeneous 0.5 percent by weight aqueous Green Soap (Eli Lilly Co.)

solution in a stoppered graduate. The graduate was gently inverted several times until the antifoam was dispersed in the soap solution. About 100 grams of the liquid mixture (antifoam and soap solution) was then added to a 1000 cc. graduate. A nitrogen bubbler containing a porous glass frit was then inserted in the graduate. Nitrogen was bubbled into the liquid mixture at a flow rate equal to the flow rate that produced 1000 cc. of foam (foam and liquid) in 2 minutes from 100 grams of said soap solution in the absence of the presence of any antifoam agent. The foam volume produced by each liquid mixture (antifoam and soap solution) is then recorded by reading the height of the foam in the graduate at 5 and 10 minute intervals. The dispersibility and antifoaming activity of the antifoam tested is indicated by the recorded volume of foam so produced, the lower the foam volume the more dispersed and effective the antifoam. The volume of foam generated after five minutes has a reproducibility of about ± 20 cc while the volume of foam generated after 10 minutes has a reproducibility of about ±50cc.

EXAMPLE 1

A series of ten gram samples of non-aqueous silicone antifoam compositions were prepared, each composition consisting of about 1 gram of surface active agent used homogeneously blended in about 9 grams of a non-emulsified hydrophobic diorganosiloxane antifoam agent prepared in the manner described in Example 2 of U.S. Pat. No. 3,560,401 by heating at 150° C., 100 parts by weight of dimethylpolysiloxane having a viscosity of 500 centistokes at 25° C. 3 parts of finely divided fumed silica and 0.04 parts by weight of potassium silanolate as the catalyst. In those cases where a single surface active agent was used the compositions were prepared by merely thoroughly mixing the surface active agent and non-emulsified antifoam at room temperature with a spatula for about 1 to 2 minutes until the surface active agent was uniformly distributed throughout the antifoam. In those cases where a mixture of two surface active agents were used, the surface active agents were first blended together in the proper ratio (i.e. 4 grams/4 grams for a 1:1 ratio and 4 grams/2 grams for a 2:1 ratio) and then heated to make a homogeneous mixture. The proper amount of surface active agent mixture was then added to the non-emulsified antifoam agent and the mixture heated and stirred until the surface active agents melted and were uniformly distributed throughout the antifoam. The non-aqueous antifoam compositions so prepared are listed below along with the identified surface acitve agent present in each composition.

| Non-Aqueous Antifoam Composition | Surface Active Agent |
|---|---|
| I | A |
| II | B |
| III | C |
| IV | D |
| V | E |
| VI | F |
| VII | G |
| VIII | H |
| IX | I |
| X | J |
| XI | K |
| XII | L |
| XIII | M |
| XIV | O |
| XV | P |
| XVI | R |
| XVII | V |
| XVIII | X |
| XIX | Y |
| XX | Z |
| XXI | AA |

EXAMPLE 2

A series of 10 gram samples of non-aqueous silicone antifoam compositions were prepared by repeating the procedure of Example 1 except that in this instance each prepared composition consisted of about 0.5 grams of surface active agent homogeneously blended in about 9.5 grams of the same non-emulsified antifoam agent defined in Example 1. The non-aqueous antifoam composition so prepared are listed below along with the identified surface active agent present in each composition.

| Non-Aqueous Antifoam Composition | Surface Active Agents |
|---|---|
| XXII | A |
| XXIII | B |
| XXIV | F |
| XXV | K |
| XXVI | O |
| XXVII | Q |
| XXVIII | R |
| XXIX | S |

EXAMPLE 3

A series of 10 gram samples of non-aqueous silicone antifoam compositions were prepared by repeating the procedure of Example 1 except that in this instance each prepared composition consisted of about 0.2 grams of surface active agent homogeneously blended in about 9.8 grams of the same non-emulsified antifoam agent defined in Example 1. The non-aqueous antifoam compositions so prepared are listed below along with the identified surface active agent present in each composition.

| Non-Aqueous Antifoam Composition | Surface Active Agent |
|---|---|
| XXX | A |
| XXXI | K |
| XXXII | T |
| XXXIII | U |

EXAMPLES 4 to 27

The non-aqueous silicone antifoams produced in Example 1 above were tested according to the Test Procedure defined above and the results of said tests are given below in TABLE I.

For comparison three control antifoams were also tested.

Control antifoam XXXIV consisted of the neat non-emulsified hydrophobic diorganosiloxane antifoam agent defined in Example 1, i.e. free of any additives. The same Test Procedure defined above was repeated using about 0.1 grams of said antifoam XXXIV and about 250 grams of the same soap solution.

Control antifoam XXXV consisted of about a 2 weight percent solution of Control Antifoam XXXIV in Dimethyl Cellosolve, a dispersing solvent. The same Test Procedure defined above was repeated using about 2 grams of said antifoam XXXV and about 98 grams of the same soap solution.

Control antifoam XXXVI consisted of about a 10 percent by weight aqueous emulsified solution of Control antifoam XXXIV. The same Test Procedure defined above was repeated using about 1 gram of said antifoam XXXVI and about 250 grams of the same soap solution.

The results of said comparison tests are also given in TABLE I below.

TABLE I

| Ex. No. | Antifoam Composition | Foam Volume (cc) After 5 Minutes | Foam Volume (cc) After 10 Minutes |
|---|---|---|---|
| 4 | I+ | 470 | 510 |
| 5 | II+ | 430* | 500* |
| 6 | III | 470* | 542* |
| 7 | IV | 480 | 545 |
| 8 | V | 510 | 580 |
| 9 | VI | 500** | 587** |
| 10 | VII | 515* | 600* |
| 11 | VIII+ | 650 | 790 |
| 12 | IX | 520 | 620 |
| 13 | X++ | 480 | 560 |
| 14 | XI | 550 | 620 |
| 15 | XII++ | 520 | 600 |
| 16 | XIII++ | 500 | 555 |
| 17 | XIV | 490 | 550 |
| 18 | XV+ | 435 | 490 |
| 19 | XVI | 440 | 510 |
| 20 | XVII | 490 | 545 |
| 21 | XVIII | 470 | 540 |
| 22 | XIX | 475 | 550 |
| 23 | XX | 465 | 540 |
| 24 | XXI | 510 | 590 |
| 25 | XXXIV | 670 | 680 |
| 26 | XXXV | 440 | 480 |
| 27 | XXXVI | 430 | 485 |

*Average results of two runs.
**Average results of three runs.
+Viscous, lumpy
++Separated upon standing overnight

EXAMPLES 28–35

The non-aqueous silicone antifoams produced in Example 2 above were tested according to the Test Procedure defined above and the results of said tests are given below in TABLE 2.

TABLE 2

| Ex. No. | Antifoam Composition | Foam Volume (cc) After 5 Minutes | Foam Volume (cc) After 10 Minutes |
|---|---|---|---|
| 28 | XXII | 447* | 515* |
| 29 | XXIII** | 470 | 560 |
| 30 | XXIV | 540 | 640 |
| 31 | XXV | 555 | 575 |
| 32 | XXVI | 520 | 600 |
| 33 | XXVII | 490 | 550 |
| 34 | XXVIII | 445 | 515 |
| 35 | XXIX | 445 | 515 |

*Average results of three runs
**In another run the foam column broke after five minutes.

EXAMPLES 36 TO 39

The non-aqueous silicone antifoams produced in Example 3 above were tested according to the Test Procedure defined above and the results of said tests are given below in TABLE 3.

TABLE 3

| Ex. No. | Antifoam Composition | Foam Volume (cc) After 5 Minutes | Foam Volume (cc) After 10 Minutes |
|---|---|---|---|
| 36 | XXX | 478* | 535* |
| 37 | XXXI | 540 | 640 |
| 38 | XXXII | 530 | 630 |
| 39 | XXXIII | 445 | 530 |

*Average results of two runs.

The above data in Tables 1 to 3 demonstrate the superior effectiveness of the non-aqueous antifoam compositions of this invention over an equal amount (400 ppm) of the corresponding non-emulsified neat diorganosilicone antifoam agent. The lower the generated foam volume and the closer the antifoam performance comes to the behavior of the emulsified system (Antifoam XXXVI) or that obtained using a dispersing solvent (Antifoam XXXV) the more preferred the system becomes.

EXAMPLES 40–46

Antifoam compositions III, VI, XXII, XXIX and XXX were prepared on a larger scale (200 gram preparations) using the same ingredients and ratio of ingredients and compared with larger scale preparations (200 grams) of control antifoam compositions XXXIV and XXXV.

Thus, the 200 gram preparation of antifoam composition III consisted of about 20 grams of Surfactant C homogeneously blended at 40° C. with about 180 grams of antifoam composition XXXIV. The 200 gram preparation of antifoam composition VI consisted of about 20 grams of Surfactant F homogeneously blended at 70° C. with about 180 grams of antifoam composition XXXIV. The 200 gram preparation of antifoam compositions XXII and XXX consisted of about 10 grams and about 4 grams respectively, homogeneously blended at 70° C. with about 190 grams and about 196 grams respectively of antifoam composition XXXIV. The 200 gram preparation of antifoam compositions XXIX consisted of about 10 grams of a mixture of 20 grams of Surfactant D and 10 grams of Surfactant A homogeneously blended at 65° C with about 190 grams of antifoam composition XXXIV. Of course, the 200 gram preparation of antifoam composition XXXIV consisted of 200 grams of the Control non-emulsified, neat antifoam composition XXXIV defined in Example 1, while the 200 gram preparation of antifoam composition XXXV consisted of about a 2 weight percent solution of Control Antifoam XXXIV in Dimethyl Cellosolve (i.e. about 4 grams of Control Antifoam XXXIV in about 196 grams of Dimethyl Cellosolve.)

The 200 gram antifoam compositions so produced were then tested for effectiveness according to the same Test Procedure defined above using about 0.1 gram of antifoam compositions III, VI, XXII, XXIX, XXX and XXXIV respectively to about 250 grams of the soap solution and about 2 grams of antifoam composition XXXV to about 98 grams of the same soap solution. The results of said tests are given below in TABLE 4.

TABLE 4

| Ex. No. | Antifoam Composition | Foam Volume (cc) After 5 Minutes | Foam Volume (cc) After 10 Minutes |
|---|---|---|---|
| 40 | III | 515* | 605* |
| 41 | VI | 520* | 600* |
| 42 | XXII | 455 | 525 |
| 43 | XXIX | 440 | 500 |
| 44 | XXX | 450 | 510 |
| 45 | XXXIV | 567+ | 650+ |

TABLE 4-continued

| Ex. No. | Antifoam Composition | Foam Volume (cc) After 5 Minutes | Foam Volume (cc) After 10 Minutes |
|---|---|---|---|
| 46 | XXXV | 440++ | 482++ |

*Average results of two runs
+Average results of three runs (Standard deviation after 5 minutes about 31 and after 10 minutes about 46).
++Average results of twenty-three runs (Standard deviation after 5 minutes about 7 and after 10 minutes about 13).

The data in Table 4 on the larger scale preparations demonstrates good agreement with the small scale preparation data in Tables 1–3.

EXAMPLE 47

About 33.3 grams of Surfactant D and about 16.7 grams of Surfactant A were added together and the mixture stirred and heated to its melting point (about 60° C.). The blend was then allowed to cool, forming a paste-like mixture. About 950 grams of a non-emulsified hydrophobic diorganosiloxane antifoam agent prepared in the manner described in Example 2 of U.S. Pat. No. 3,560,401 by heating at 150° C., 100 parts by weight of dimethylpolysiloxane having a viscosity of 500 centistokes at 25° C., 3 parts by weight of finely divided fumed silica and 0.04 parts by weight of potassium silanolate, was then added to the surfactant and the mixture blended for about 15 minutes at about 50° C. using a ½ HP Gifford Wood Lab Homomixer with a variac setting of 40 to produce a non-aqueous antifoam composition of this invention. Said non-aqueous antifoam composition had a Brookfield viscosity (No. 1 spindle) at 3 RPM of about 1484 centipoises at about 25° C. The non-aqueous antifoam composition was tested for effectiveness according to the same Test Procedure defined above using about 0.1 grams of the antifoam composition and about 250 grams of the soap solution and the foam volume generated after 5 minutes was about 435 cc., while the foam volume generated after ten minutes was about 505 cc. Said results demonstrate the excellent effectiveness of the antifoam composition of this invention.

The instant example was repeated except this time the mixing was carried out at a variac setting of 80 for 7 minutes followed by a variac setting of 30 for 18 minutes. This time the foam volume generated after 5 minutes was found to be about 540 cc., while the foam volume volume generated after ten minutes was found to be about 650 cc. While these results are an improvement over the use of the corresponding non-emulsified, neat diorganosilicone antifoam agent, said example demonstrates that overworking the preparation of the antifoam compositions of this invention can lead to a degradation in performance.

EXAMPLE 47

This example demonstrates the stability of the non-aqueous antifoam compositions of this invention to room temperature aging. Antifoam compositions III, IV, VI, XXII, XXIX and XXX were stored at room temperature for various time periods and tested for effectiveness at the end of said time periods according to the same Test Procedure defined above in Example 1. The results of said tests are given in Table 5 below.

TABLE 5

| Non-Aqueous Antifoam Composition | Days Aged at Room Temperature | Foam Volume (cc) After 5 Minutes | Foam Volume (cc) After 10 Minutes |
|---|---|---|---|
| III* |  |  |  |
| " | 17 | 500 | 560 |
| " | 52 | 475 | 580 |
| IV* | 0 | 480 | 545 |
| " | 33 | 540 | 620 |
| VI* | 0 | 500+ | 587+ |
| " | 33 | 530 | 600 |
| " | 60 | 600 | 700 |
| XXII** | 0 | 447+ | 515+ |
| " | 19 | 435 | 510 |
| " | 35 | 440 | 510 |
| XXIX** | 0 | 445 | 515 |
| " | 0 | 450 | 520 |
| XXX*** | 0 | 483+ | 535+ |
| " | 30 | 430 | 480 |

*Same as described in Example 1.
**Same as described in Example 2.
***Same as described in Example 3.
+Freshly prepared composition.

EXAMPLE 48

This Example demonstrates the heat stability of the non-aqueous antifoam compositions of this invention upon aging at 50° C. Antifoam compositions III, VI, XXII, XXIX and XXX were stored at 50° C. for various time periods and tested for effectiveness at the end of said time periods according to the same Test Procedure defined above in Example 1. The results of said tests are given in Table 6 below.

TABLE 6

| Non-Aqueous Antifoam Composition+ | Weeks Stored at 50° C. | Foam Volume (cc) After 5 Minutes | Foam Volume (cc) After 10 Minutes |
|---|---|---|---|
| III | 1 | 515 | 600 |
| " | 2 | 490 | 590 |
| VI | 1 | 600++ | 690++ |
| " | 2 | 570 | 670 |
| XXII | 1 | 480 | 510 |
| XXIX | 1 | 440 | 510 |
| " | 2 | 425 | 445 |
| XXX | 1 | 460++ | 530++ |

+Same as described in Examples 40–46 and freshly prepared
++Average results of two runs

EXAMPLE 49

This example demonstrates the stability of the non-aqueous antifoam compositions of this invention upon freezing and thawing. Antifoam compositions III, VI, XXII, XXIX and XXX were frozen and tested for effectiveness upon being thawed according to the same Test Procedure defined above in Example 1. In some instances the antifoam composition went through two freezing and thawing cycles. The results of said test are given in Table 7 below.

TABLE 7

| Non-Aqueous Antifoam Composition+ | Freeze/Thaw No. Cycles | Foam Volume (cc) After 5 Minutes | Foam Volume (cc) After 10 Minutes |
|---|---|---|---|
| III | 1 | 518* | 625* |
| " | 2 | 540 | 640 |
| VI | 1 | 545* | 635* |
| " | 2 | 530 | 640 |
| XXII | 1 | 435 | 500 |
| XXIX | 1 | 440 | 500 |
| " | 2 | 450 | 510 |
| XXX | 1 | 453** | 527** |

+Same as described in Examples 40–46 and freshly prepared.
*Average results of 2 runs
**Average results of 3 runs.

Various modifications and variations of this invention will be obvious to a worker skilled in the art and it is to be understood that such modifications and variations are to be included within the purview of this application and the spirit and scope of the appended claims.

What is claimed is:

1. A non-aqueous silicone antifoam composition consisting essentially of a lipophilic nonionic surface active agent having a hydrophilic-lipophilic balance value of up to about 10 homogeneously dispersed in a non-emulsified hydrophobic diorganosiloxane antifoam agent, wherein said surface active agent is selected from the group consisting of organic surface active agents and siloxane surface active agents consisting essentially of siloxy units of the formula $R_3SiO_{0.5}$, $R_2SiO$ and $[R'''(R'')_nR']Si(R)O$ wherein R is a methyl radical, R' is a divalent propylene radical, R" is an oxyalkylene group, R''' is an alkoxy radical of 1 to 4 carbon atoms and $n$ is an integer, and wherein the amount ratio of said surface active agent to said antifoam agent ranges from about 0.2 to about 25 parts by weight of the surface active agent per 100 parts by weight of the antifoam agent.

2. An antifoam composition as defined in claim 1, wherein the lipophilic surface active agent is a nonionic organic surface active agent.

3. An antifoam composition as defined in claim 1, wherein the diorganosiloxane antifoam agent consists essentially of the product resulting from heating a mixture consisting essentially of a finely divided inorganic filler and a diorganopolysiloxane polymer.

4. An antifoam composition as defined in claim 3, wherein the inorganic filler is silica and the diorganopolysiloxane polymer is a trimethyl endblocked dimethylsiloxane polymer having a viscosity of about 5 to 3000 centistokes at 25° C. and wherein the said filler and diorganopolysiloxane polymer are heated at a temperature from about 100° C. to about 200° C. for at least ½ hour.

5. An antifoam composition as defined in claim 4, wherein said filler and diorganopolysiloxane polymer are heated in the presence of a basic catalyst.

6. An antifoam composition as defined in claim 5, wherein the catalyst is potassium silanolate.

7. An antifoam composition as defined in claim 4, wherein the lipophilic surface active agent is a nonionic organic surface active agent and wherein the ratio of said surface active agent to said antifoam agent ranges from about 1 to about 12 parts by weight of the surface active agent per 100 parts by weight of the antifoam agent.

8. An antifoam composition as defined in claim 7, wherein the ratio of said surface active agent to said antifoam agent ranges from about 5 to about 10 parts by weight of the surface active agent per 100 parts by weight of the antifoam agent.

9. An antifoam composition as defined in claim 8, wherein said filler and diorganopolysiloxane polymer are heated in the presence of a basic catalyst.

10. An antifoam composition as defined in claim 9, wherein the catalyst is potassium silanolate.

11. An antifoam composition as defined in claim 10, wherein the lipophilic surface active agent consists of two different nonionic organic surface active agents.

12. An antifoam composition as defined in claim 1, wherein the siloxane surface active agent consists essentially of siloxy units of the formula $R_3SiO_{0.5}$, $R_2SiO$ and $[R'''(R'')_nR']Si(R)O$ wherein R is a methyl radical, R' is a divalent propylene radical, R" is an oxyalkylene group, R''' is an alkoxy radical of 1 to 4 carbon atoms and $n$ is an integer, and wherein the ratio of said surface active agent to said antifoam agent ranges from about 5 to about 10 parts by weight of the surface active agent per 100 parts by weight of the antifoam agent.

* * * * *

UNITED STATES PATENT OFFICE
CERTIFICATE OF CORRECTION

Patent No. 4,076,648    Dated February 28, 1978

Inventor(s) M.R. Rosen

It is certified that error appears in the above-identified patent and that said Letters Patent are hereby corrected as shown below:

In line 2 of claim 12 before the term "siloxane" insert the phrase --- lipophilic surface active agent is a nonionic ---.

Signed and Sealed this

Seventeenth Day of October 1978

[SEAL]

Attest:

RUTH C. MASON
Attesting Officer

DONALD W. BANNER
Commissioner of Patents and Trademarks